United States Patent [19]

Kishida

[11] 4,362,556
[45] Dec. 7, 1982

[54] ARC FURNACE STEELMAKING INVOLVING OXYGEN BLOWING

[75] Inventor: Toshio Kishida, Nagoya, Japan

[73] Assignee: Daido Tokushuko, K.K., Nagoya, Japan

[21] Appl. No.: 218,174

[22] Filed: Dec. 19, 1980

[30] Foreign Application Priority Data

Dec. 19, 1979 [JP] Japan .................................. 54-164012

[51] Int. Cl.³ .............................................. C21C 5/52
[52] U.S. Cl. .......................................... 75/12; 75/57; 75/58
[58] Field of Search .......................... 75/57, 58, 10–12

[56] References Cited

U.S. PATENT DOCUMENTS 4,222,768  9/1980  Suyama ..................................... 75/57

Primary Examiner—P. D. Rosenberg
Attorney, Agent, or Firm—Armstrong, Nikaido, Marmelstein & Kubovcik

[57] ABSTRACT

In arc furnace steelmaking, oxygen gas is blown in the molten steel at melting period and/or oxidizing period so as to decrease the carbon content therein to 0.20% or less, preferably 0.15% or less, and subsequently, carbonaceous material is blown in the furnace by utilizing flow of a carrier gas.

A higher melting yield and a smaller amount of slag production are achieved with an improved productivity and lower energy consumption.

7 Claims, 2 Drawing Figures

ARC FURNACE STEELMAKING INVOLVING OXYGEN BLOWING

BACKGROUND OF THE INVENTION

1. Field of the Invention

The present invention relates to an improved method of steelmaking using an arc furnace. The method realizes, beside increased productivity and decreased energy consumption, a higher yield of refined steel and a smaller amount of waste products.

2. State of the Art

During the process of transition of the type of furnace for steelmaking from open-hearth furnaces to converters, steelmaking using an arc furnace has occupied an important position. This has been supported for the most part by remarkable improvement in productivity of steelmaking in an arc furnace.

When compared with converter steelmaking in which a hot material such as molten pig iron is used, arc furnace steelmaking is handicapped by starting from a cold material such as scrap iron. Accordingly, improvement in the productivity of the arc furnace steelmaking depends on how it could be possible to decrease time and energy for melting the charged cold materials.

One of the main solutions proposed for this purpose is co-called "UHP" electric furnace operation, which uses increased electric power input per unit period of time; and the other is utilization of an auxiliary burner which uses an energy source other than electricity. It can be said that these technologies proved successful to some extent. However, they have limitation in application due to limited capacity of the electric transformer or the burner.

In order to overcome this limitation, there has been tried utilization of oxygen gas. In that technology, during and at the last stage of melting the charged materials with the heat of electric arc, oxygen is blown into the furnace in the maximum amount which the equipment permits; and after formation of smooth molten steel surface, while feeding electric current, oxygen is introduced in an amount excess to the amount necessary for decarburization. In an equipment having an auxiliary burner, oxygen is fed through the burner in an amount excess to the amount necessary for burning the fuel oil. I named the operation of these types "oxygen-enriched operation" in arc furnace steelmaking.

According to the oxygen-enriched operation, melting of solid materials and temperature increase of the molten steel are accelerated by the heat of reaction generated by oxidation of some components in the charged materials, such as carbon, silicon and iron, with the introduced oxygen. Moreover, unmelted large solid pieces adhered to the furnace wall could be cut down by heat to diminish unhomogeneous melting in the furnace. Thus, the productivity of the steelmaking is remarkably improved.

The advantages of the oxygen-enriched operation include not only reduction of the operation period, but also considerable reduction of electric power consumed in the arc furnace for the melting and refining. Intake of heat by arc takes place at the upper part of the charged materials or the molten steel because of the structure of the furnace, and therefore, it is more or less inevitable that a portion of the heat generated is lost due to reflection of radiated heat. On the other hand, the heat of the oxidation reactions occurs at the surface of the charged materials and in the molten steel, and therefore, the most part of the heat can be utilized. Thus, when the efficiency of the total energy input is considered by calculating the used oxygen gas in terms of energy to sum up with the electric energy, it will be higher as the amount of oxygen input increases. (For example, oxygen input of 10 $Nm^3$ per charged ton will give 10% or more improvement of the efficiency, and at 20 $Nm^3$, the improvement will reach 20%.)

Although the oxygen-enriched operation is an advantageous method of arc furnace steelmaking as described above, in the process of further seeking the profit thereof, I experienced novel difficulties. One of them is lowered melting yield or the percentage of obtainable molten steel by weight of the charged materials such as scrap iron. The other is, in close relation to the lowered melting yield, increased amount of slag which is residual matter of the melting.

SUMMARY OF THE INVENTION

The object of the present invention is so obviate the above difficulties, and to provide an improved method of arc furnace steelmaking in which a higher melting yield is obtained and the amount of slag does not increase, while the method maintains the advantages of improved productivity and energy saving inherent in the oxygen-enriched operation.

The above object is achieved in accordance with the present invention by taking the following steps in arc furnace steelmaking:

(a) blowing oxygen into the furnace at melting period and/or oxidizing period so as to prepare a molten steel with a carbon content of 0.20% or less; and subsequently, (b) blowing a carbonaceous material into the molten steel in the furnace by utilizing flow of a carrier gas.

DRAWINGS

DETAILED DESCRIPTION OF PREFERRED EMBODIMENTS

The above step (a) of the present method can be carried out in accordance with known technology, i.e., oxygen gas may be introduced in the furnace by blowing it through an usual lance pipe, or, in case of using an auxiliary burner, by feeding oxygen gas of the amount excess to that necessary for burning the fuel oil.

Figure 1:
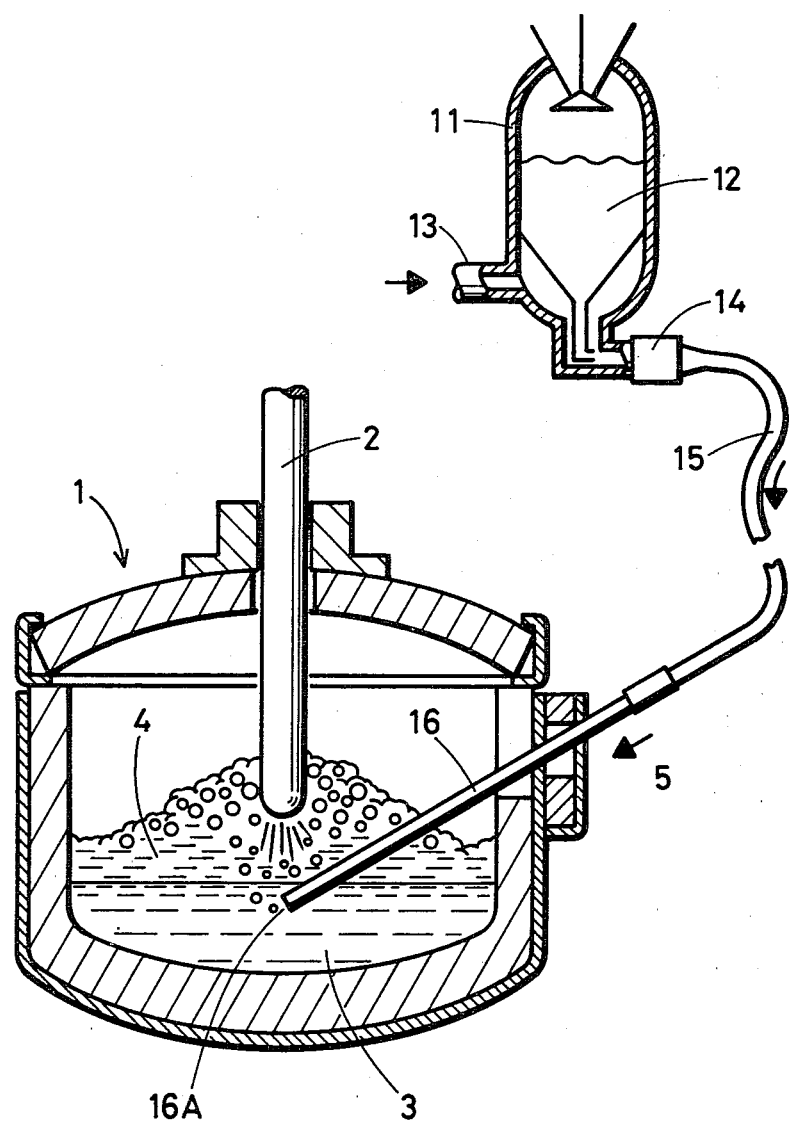
FIG. 1 is a schematic cross-sectional view of an arc furnace, showing step (b) of the present method.

The subsequent step (b) is schematically illustrated in FIG. 1. In the Figure, an arc is generated in furnace 1 between electrode 2 and molten steel 3 so as to conduct the refining. The surface of the molten steel is covered with slag 4. Vessel 11 contains powder of a carbonaceous material 12, which is carried by, for example, compressed air of 5 $kg/cm^2$ coming through inlet 13 to leave the vessel from outlet 14 and, by way of flexible hose 15, reaches lance pipe 16. The feeding of the carbonaceous material may be adjusted to a suitable amount with an adjusting means (not shown in the Figure) equipped at the bottom of vessel 11. Lance pipe 16 is inserted into the molten matters in the furnace through an aperture 5 provided in the slag-discharging door. Suitable position of nozzle 16A of the lance pipe is usually on or in the neighbor of the interface of molten steel 3 and molten slag 4. It should be, however, adjusted up or down in the molten steel or in the slag taking into account the amount of carbon to be in the steel and the stage of the refining. When carbon is introduced by the carrier gas the molten slag rises as described after.

For the sake of better understanding of the characteristic features of this method, it will be useful to describe the history of development of the present invention.

As well known, iron oxide content in a molten slag over a molten steel is determined by oxygen content (more exactly, activity of oxygen) in the molten steel, and as the oxygen content in the molten steel becomes higher, the iron oxide content in the slag is higher. On the other hand, the oxygen content in a molten steel is determined, under the condition of sufficient supply of oxygen given by the oxygen-enriched operation, mainly by carbon content in the molten steel.

The correlation between the carbon content and the oxygen content has been studied from old time, and the graph well known as "Batcher-Hamilton's Correlation" appears in various handbooks or the like. According to the correlation, at a higher carbon content in a molten steel is generally accompanied by a lower oxygen content. Consequently, iron oxide content in the slag which coexists with the molten steel will be also low. In contrast with this, a lower carbon content in the molten steel is accompanied by a higher oxygen content which will result in a higher iron oxide content in the slag.

In my survey on the improvement of the melting yield in the oxygen-enriched operation, I tried first to arrange composition of the molten steel based on the above described knowledge. More particularly, the trial comprised keeping the carbon content in the molten steel on a suitable level at the time of completing the oxygen-enriched operation by increasing the amount of carburizing material (or previously added carburizing material) which is charged with other materials such as scrap iron, or by choosing the kind of the carburizing material, so as to keep the oxygen content in the molten steel on a relatively low level.

The above arrangement of the carbon content in the molten steel using the previously added carburizing material was found to be generally effective until the amount of oxygen introduced in the furnace does not exceed 5 to 6 Nm$^3$ per charged ton, and it is possible to prevent decrease of the melting yield and increase of the slag to some extent, while enjoying more or less the advantages of the oxygen-enriched operation.

However, in order to fully enjoy the advantages of the oxygen-enriched operation, the oxygen input should be further increased. My experiments revealed that, when such a large amount of oxygen as 10 Nm$^3$ per charged ton or more is used, it is impossible to keep the carbon content in the molten steel by using the previously added carburizing material. This is because the most part of the carbon given by the usual method of charging burns with the oxygen, and therefore, little carbon dissolves in the molten steel. Even if an extremely large amount of the previously added carburizing material is used, it is apt to come out of the furnace by being incorporated in a part of the slag which is discharged during the refining process, or it is often held in the unmelted matters adhered to the furnace walls and falls down in the subsequent refining stage to disturb the refining.

In view of the above experience, I propose the present invention which comprises blowing powdery carbonaceous material into the furnace by utilizing flow of a carrier gas.

The introduction of the carbon powder with the carrier gas at the stage of refining the molten steel in an arc furnace has been already proposed by the present inventor (Japanese patent application No. 159187/1978).

However, the purpose of introducing the carbon powder in this previous invention is to form a foamed layer of slag given by bubbles of the carrier gas and generated carbon monoxide gas at the upper part of the slag, which serves for containment of heat and thermal insulation of the molten steel for the purpose of saving electric power consumption and reduction of the necessary operation time.

These merits can be obtained also in the presently proposed invention. The novel feature of the present method is to once decrease the carbon content in the molten steel to a certain low level, and then to re-feed carbon. In other words, I dismissed the idea of carrying out the oxygen-enriched operation under keeping the carbon content in the molten steel according to the aforesaid Batcher-Hamilton's Correlation, which idea having been established in the art, and took the position to introduce sufficient amount of oxygen in the furnace without paying regard to decrease of carbon content in the molten steel and resulting oxidation of iron, and then, to reduce thus formed iron oxide with carbon so as to recover it as metallic iron.

Because Hess' Law is by its nature applicable to varous chemical reactions occurring in arc furnaces, there may be an apprehension that the heat generated by oxidation of iron during the oxygen-enriched operation would be offset in the process of reduction of the iron oxide. When oxygen of the same amount reacts with carbon or iron, much more heat will be generated in the former case:

$$Fe + O = FeO + 109.6 \text{ Kcal/mol-}O_2$$

$$C + O = CO + 52.8 \text{ Kcal/mol-}O_2$$

Taking into account the endothermic reaction:

$$FeO + C \rightarrow Fe + CO - 56.8 \text{ Kcal/mol-}O_2$$

it was estimated that only the heat of combustion of carbon could be utilized.

Nevertheless, as shown in the Examples given below, it was confirmed that the energy-saving effect of the oxygen-enriched operation is not damaged by the introduction of the carbonaceous material. The most important reason for this is considered to be the effect of the above noted foaming of the slag. The introduced carbon reduces the iron oxide to form carbon monoxide gas, and the gas as well as the carrier gas foams the slag. The top of the foamed layer rises 50 cm to 1 m high from the initial state or before introduction of carbon to envelop the tip of the electrode, to which electric current is supplied, and the foamed slag completely submerges the arc. Thus, the heat of arc can be highly utilized.

This effect has been, as described above, already offered by the previously proposed invention; but it is more remarkably obtained in the present invention, because, in the latter case, carbon is introduced in the furnace when the oxygen contents in the molten steel and slag are high due to the prior oxygen-enriched operation, and therefore, much more carbon monoxide gas occurs. According to the inventor's experience, the thermal efficiency at the time of temperature increase by using electric energy is about 30% in case of no carbon introduction after the oxygen-enriched operation, while the efficiency advances to about 60% if carbon is introduced. This improvement of the efficiency will be sufficient to compensate the heat deprived by the reduction of the iron oxide in practice using, for example, a furnace of nominal capacity 70 tons, into which 300 kg of carbonaceous material is introduced over 5 minutes.

The characteristic features of the present method will be further explained below.

The carbon content in the molten steel should be decreased to 0.20% or less, preferably 0.15% or less, and in more preferable operation, 0.10% or less. This is not a requisite of the refining process in arc furnaces, but a condition resulting from the oxygen-enriched operation. In other words, the above carbon content in the molten steel indicates the fact that oxygen has been introduced in such amount that the advantages of the oxygen-enriched operation is assured. For the sake of finding the point of switching the steps, this is an important requisite of the method. From a practical view point, the amount of oxygen which gives the above carbon content in the molten steel will be usually 10 $Nm^3$ per charged ton or more.

Figure 2:
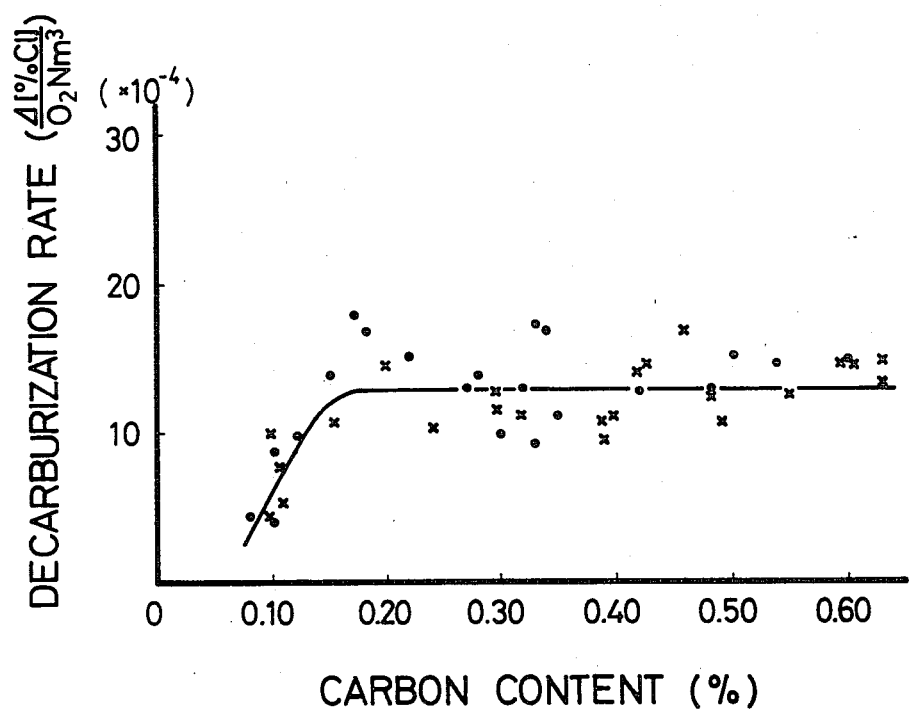
FIG. 2 is a graph showing the relation between the carbon content of the molten steel and the rate of decarburization at the time of blowing oxygen into the furnace at step (a) of the present method.

This practical condition was determined from my experience in the process of studying the oxygen-enriched operation, and was supported by an experiment on decarburization in an arc furnace of 70 ton. FIG. 2 is a graph showing the relation between the carbon content in the molten steel and the rate of decarburization at the time of introducing oxygen in the furnace. As seen from the graph, as the carbon content in the molten steel decreases to 0.20% or less, more clearly, to 0.15% or less, rate determining step of the decarburization reaction changes from supplying of oxygen to diffusion of carbon. At a carbon content lower than the above limit, the oxygen supplied in the furnace mainly oxidize iron. However, according to the present invention, even though iron is consumed by the oxidation, it is reproduced by the subsequent introduction of carbon. Thus, even if the carbon content in the molten steel decreases to such a low level as 0.10% or less, there will be no disadvantage. Consequently, without paying regard to the decrease of the carbon content, oxygen may be introduced to the extent that the merits of the oxygen-enriched operation can be fully enjoyed.

The carbonaceous material to be introduced should contain at least 60%, preferably 80% of carbon. Those containing carbon of less than 60% generally exhibits low carbon activity, and do not effectively contribute to the reduction of iron oxide when introduced in the furnace. The material should be in the form of fine particles of an average size 5 mm or less. If the particles are coarse, it is difficult to transfer them with flow of a carrier gas. Moreover, because of relatively small surface area for reaction, they may not be completely utilized for the reduction of the iron oxide during moving in the molten slag to float up on the surface, and may be discharged without further reaction. The amount of the carbonaceous material to be intorduced will be, in terms of net carbon content, more than 1 kg, usually up to 4 or 5 kg per charged ton.

As the carrier gas, an inert gas such as argon is of course suitable, and the other gas such as nitorgen or even air can be used.

In case where a lower carbon content in the product steel is desired, it is realized by blowing oxygen in the molten steel again after the introduction of the carbonaceous material to decrease the carbon content to the predetermined level.

The blowing of the secondary oxygen may be, in an alternative way, conducted simultaneously with the introduction of the carbonaceous material so as to slowly increase the carbon content. In this case, however, in order to avoid possible explosion, it is necessary to introduce oxygen and carbon through separate apparatus for blowing in the molten steel. The lower carbon content could be also achieved by using air as the carrier gas for the carbonaceous material (as far as the resulting gas-dust mixture remains out of the explosive limits, it is possible to use air added with a small amount of oxygen.)

Those skilled in the art will be able to practice various modifications of the described method.

The following examples of steelmaking illustrate the present method in comparison with a conventional method and an oxygen-enriched operation, all of them using a UHP arc furnace of nominal capacity of 70 tons.

EXAMPLE I (Conventional Method)

32 tons of iron scrap purchased in market and 21 tons of return scrap occured in steel processing were charged in the arc furnace with 1 ton of coke and 2 tons of quick lime, and electric current was supplied.

After 33 minutes, electric current was interrupted and additional 34 tons of the purchased scrap was charged. Electric current supply resumed. 64 minutes after the beginning of the electric current supply, sample of the molten steel was taken out for analysis of the composition. The carbon content in the molten steel at this stage was determined to be 0.25%.

Then, for the purpose of decreasing carbon content in the molten steel (or decarburization), 120 $Nm^3$ of oxygen gas was blown in the molten steel through a lance pipe. When the blowing completed, the second sample for analysis was taken, the carbon content of which was 0.08%.

After the completion of the oxygen blowing, electric current supply resumed, and when the temperature of the molten steel increased to 1650° C., another sample for analysis was taken. Then, slag in the furnace was discharged. At this stage, the carbon content in the molten steel was 0.06%. Based on the analytical results of the molten slag which was taken at the same time, the iron oxide content was found to be 25%. Following the discharge of the slag, 2.6 tons in total of alloying elements were added in the furnace together with quick lime and fluorite. These additives melted by heat of resumed electric current supply, and when the temperature of the molten steel reached 1630° C., the molten steel was transferred from the furnace to a ladle.

The carbon content in the discharged molten steel was analized to be 0.21%. The obtained steel weighed 86,200 Kg, and the melting yield was 96.2%.

The slag discharged after the decarburization and the temperature increase weighed 5.1 tons.

Electric energy consumption per discharged steel, given by dividing the overall electric power input by the weight of the obtained steel, was 510 KWH.

The inner walls of the arc furnace were repaired with refractories, and the materials for the next steelmaking were charged. Beginning of the second electric current supply was 121 minutes after the beginning of the electric supply of the first steelmaking.

EXAMPLE II (Oxygen-Enriched Operation)

The same materials as used in Example I were charged in the arc furnace, and electric current was supplied. Since 10 minutes after the start of the current supply, oxygen gas was introduced through a lance pipe in the furnace. When 28 minutes elapsed from the beginning, supply of electric current and oxygen gas was interrupted for additional charging of 34 tons of purchased iron scrap in the furnace, and then, electric current supply was resumed. 5 minutes after the resumption of electric current supply, introduction of oxygen gas in the furnace was resumed. When almost all the charged solid matters melted down in the molten steel bath through continued operation to form a smooth liquid surface, a sample for analysis was taken. The carbon content in the molten steel at this stage was 0.10%. Introduction of oxygen gas in the steel bath was continued under electric current supply to increase temperature of the molten steel.

When increasing temperature of the molten steel was observed to have reached 1650° C., another sample for analysis was taken, and then, molten slag in the furnace was discharged. The carbon content in the molten steel at this stage was 0.04%. On the basis of analytical data of the slag taken at the same time as the steel sample, iron oxide content in the slag was 45%.

The same procedures as Example I were repeated after the discharge of the slag, and the molten steel was transferred into the ladle.

The melting yield obtained by the above operation was 94.5%. The slag discharged from the furnace weighed 7.2 tons.

The unit electric power consumption was calculated to be 455 KWH per ton-steel, and the used oxygen gas volume was 1490 $Nm^3$. 87 minutes were recorded as the length of time for one cycle from the beginning of the electric current supply to the resumption of the supply for the second operation.

EXAMPLE III (Present Method)

From the melting down of charged materials to the formation of a smooth surface of the steel bath and the sampling, the same procedures of the oxygen-enriched operation as Example II were conducted. Then, oxygen gas was introduced through the lance pipe in the molten steel under electric current supply so as to increase the temperature of the bath.

When the temperature of the molten steel was observed to be at 1570° C., the introduction of oxygen gas was interrupted, while the electric current supply was continued.

An iron lance pipe was quickly inserted in the furnace, through which carbon powder was blown in by utilizing air as the carrier gas thereof. The rate of introduction of the carbon powder was 60 Kg/min. A little while after the introduction of carbon, there was observed remarkable diminishing of noise due to the arc, and the molten slag in the furnace foamed to raise its top about 1 m high. The period of blowing carbon in the furnace continued 5 minutes, and hence, the total weight of introduction was about 300 Kg.

After completion of the introduction of carbon and observation of the temperature increase of the steel bath to 1650° C., a sample for analysis was taken and the slag was discharged.

The carbon content in the molten steel at this stage was 0.06%. The iron oxide content in the slag which was in the furnace was determined to be 21%.

The melting yield achieved by the present method was 96.3%, and the discharged slag amounted 5.0 tons.

The unit electric power consumption was 452 KWH per ton-steel, and the consumed oxygen gas amounted 1510 $Nm^3$. The length of period for one cycle between the beginnings of the electric current supply was 88 minutes.

The above results are summed up in the following Table. Comparison of the data will clearly show tha fact that the arc furnace steelmaking according to the present invention realizes a higher melting yield and a lower slag formation, while retaining the merits of the improved productivity and energy comsumption given by the oxygen-enriched operation.

TABLE

|  | Example I | Example II | Example III |
|---|---|---|---|
| Productivity (Ton-molten steel/Hour) | 41 | 58 | 60 |
| Energy Consumption (G Cal/Ton-Molten Steel) | 1.26 | 1.14 | 1.13 |
| Melting Yield (%) | 96.2 | 94.5 | 96.3 |
| Discharged Slag (Ton/Charge) | 5.1 | 7.2 | 5.0 |

I claim:

1. A method of steelmaking using an arc furnace characterized in that the method includes the steps of:
   (a) blowing oxygen into the furnace throughout a melting period and an oxidizing period in an amount of at least 10 $Nm^3$ per charged ton calculated in terms of pure oxygen gas so as to decrease carbon content of a molten steel until it becomes 0.20% or less; and subsequently,
   (b) blowing a carbonaceous material having a carbon content of at least 60% by weight into the molten steel in the furnace by utilizing flow of a carrier gas.

2. A method of steelmaking according to claim 1, wherein the blowing of oxygen is carried out so as to prepare a molten steel with a carbon content of 0.15% or less.

3. A method of steelmaking according to claim 1, wherein oxygen is blown into the furnace again after the blowing of the carbonaceous material into the molten steel.

4. A method of steelmaking according to claim 1, wherein oxygen is blown into the molten steel simultaneously with the blowing of the carbonaceous material into the molten steel.

5. A method of steelmaking according to claim 1, wherein the oxygen blown into the furnace is in the form of pure oxygen gas or oxygen-enriched air.

6. A method of steelmaking according to claim 1, wherein the carbonaceous material is crushed down to particles of an average size about 5 mm, and wherein the amount blown in is at least 1.0 kg per charged-ton calculated in terms of carbon.

7. A method of steelmaking according to claim 1, wherein the carrier gas is chosen from argon, nitrogen and air.

* * * * *